July 12, 1932. W. F. BRACE ET AL 1,867,397
FILTERING APPARATUS
Filed Jan. 19, 1931  5 Sheets-Sheet 5

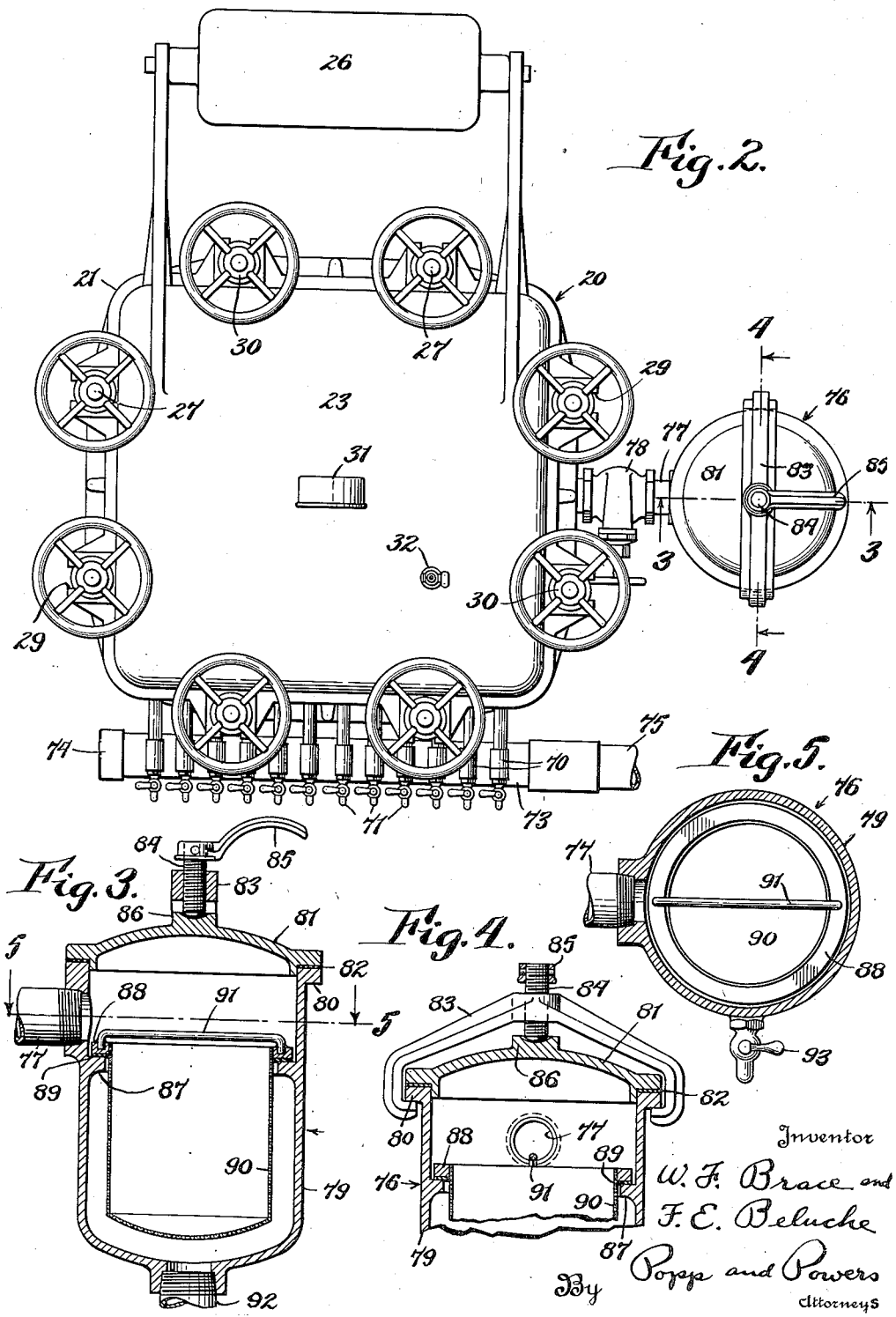

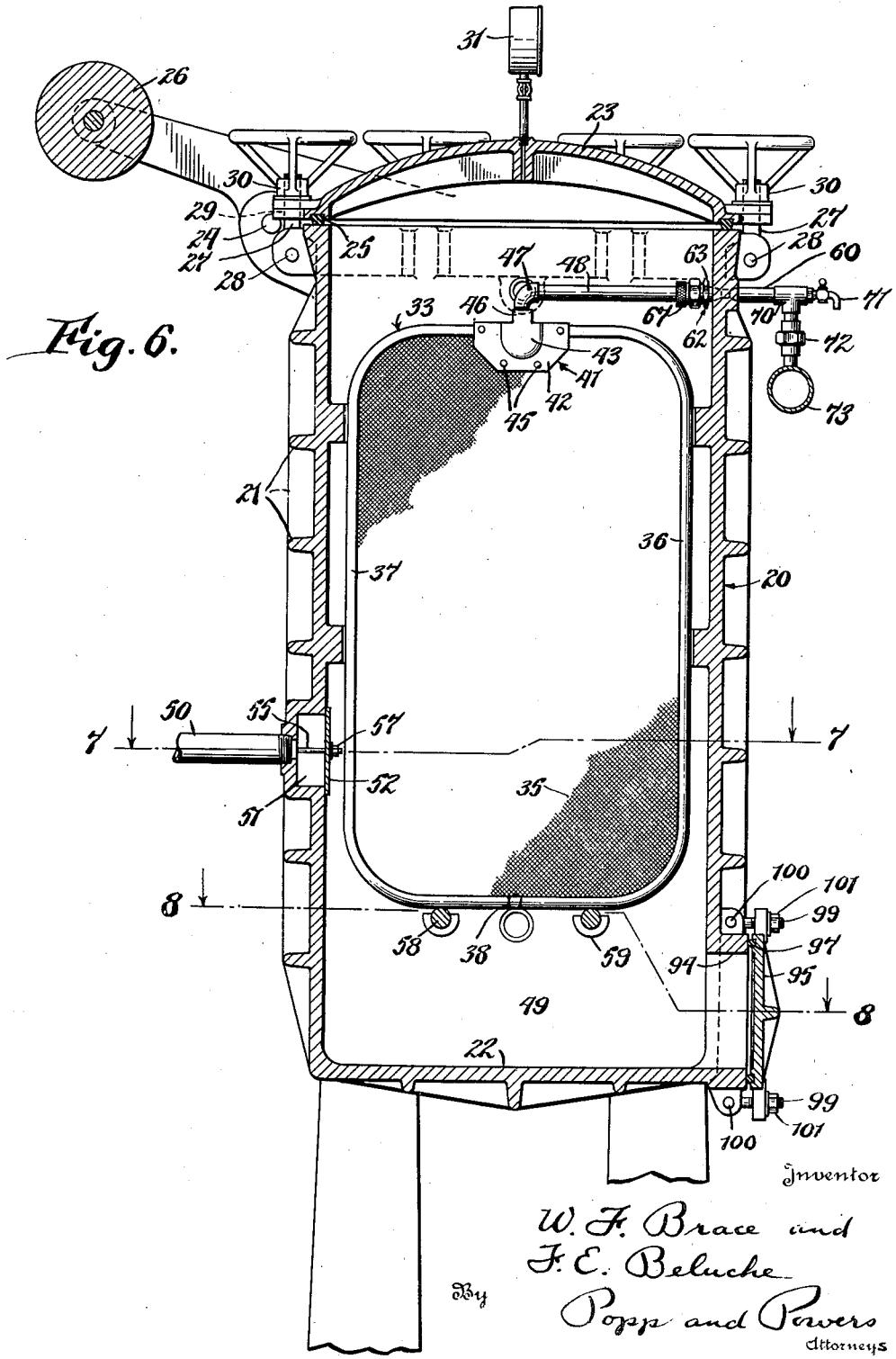

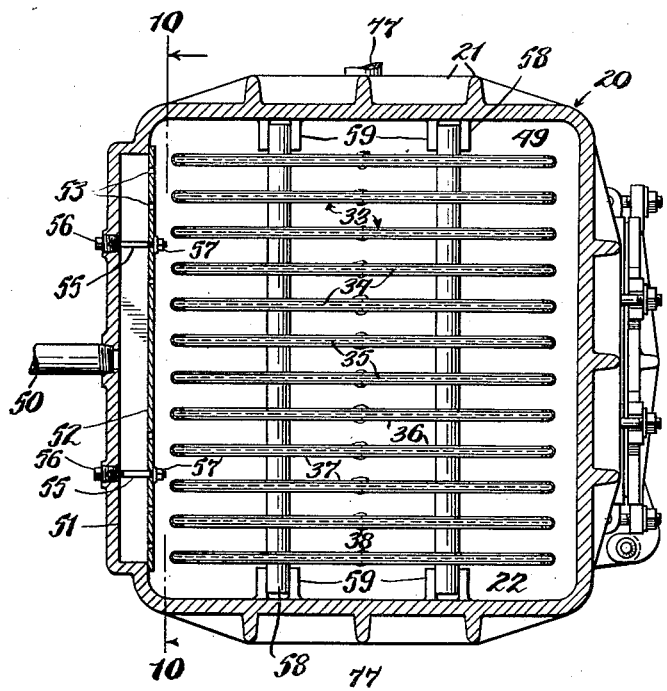
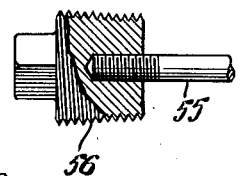
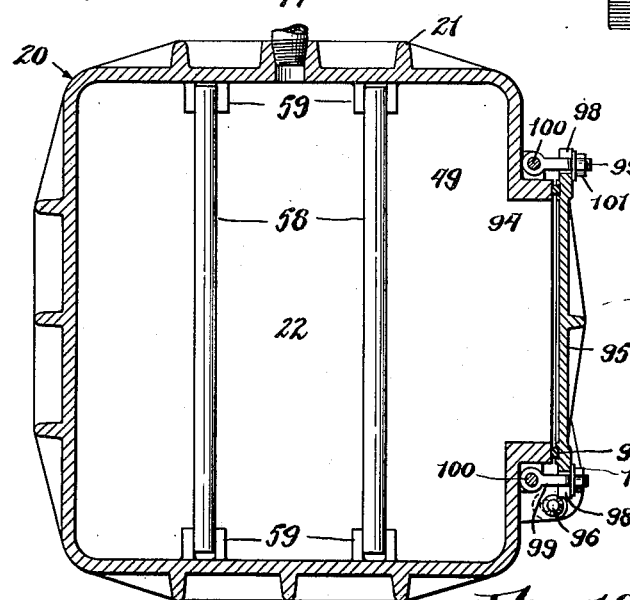
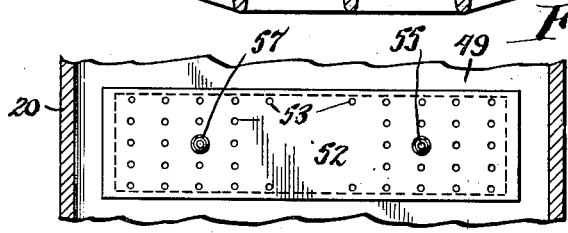

Inventor
W. F. Brace and
F. E. Beluche
By Popp and Powers
Attorneys

Patented July 12, 1932

1,867,397

UNITED STATES PATENT OFFICE

WILLIAM F. BRACE AND FERNAND E. BELUCHE, OF BUFFALO, NEW YORK, ASSIGNORS TO S. F. BOWSER & COMPANY, INC., OF FORT WAYNE, INDIANA, A CORPORATION OF INDIANA

FILTERING APPARATUS

Application filed January 19, 1931. Serial No. 509,591.

This invention relates to a pressure filtering apparatus and the filtering apparatus shown and described is more particularly designed for filtering dirt sediment from solvents, such as gasolene used in dry cleaning processes and thereby enable the solvents to be used over again.

One of the principal objects of this invention is to provide a compact and inexpensive filtering apparatus of this character which thoroughly filters the solids from a liquid material such as a liquid solvent and will not clog up for a relatively long time thereby permitting the filtering apparatus to be used a comparatively long time before cleaning of the same is required.

A further object is to provide a filtering apparatus of this character which embodies a multiplicity of filtering units each of which can be individually tested to determine its efficiency, that is whether it has become clogged with sediment or not.

Another purpose is to provide a filtering apparatus embodying a multiplicity of filtering units in which the filtering units can be readily and individually removed as may be required for the purposes of cleaning and also to provide a filtering apparatus in which the chamber containing these units and all parts contained in this chamber can also be readily cleaned of the accumulated sediment.

A further aim is to provide such a filtering apparatus embodying a multiplicity of filtering units in which the filtering units are strong and durable, can be produced at very low cost and provide a very large filtering area so that they do not clog up quickly.

Another aim is to provide a simple and inexpensive means for distributing the incoming solvent to the several filtering units so that each filtering unit does a proportionate share of the work, and also to make such distributing means easily accessible and easy to assemble.

A further purpose is to provide such a filtering apparatus which is continuous in its operation, that is, operative during the cleaning of the apparatus, so that at no time is there a long interruption in the supply of cleaned or filtered solvent and the withdrawal of dirty solvent to be cleaned.

In the accompanying drawings:

Fig. 2 is a top plan view thereof.

Fig. 3 is a vertical section through the supplemental filter taken on line 3—3, Fig. 2, this supplemental filter being used when the main filtering elements are being cleaned.

Fig. 4 is a similar section taken on line 4—4, Fig. 2.

Fig. 5 is a horizontal section through the supplemental filter taken on line 5—5, Fig. 3.

Fig. 6 is a vertical fore and aft section through the main filter apparatus.

Fig. 7 is a horizontal section taken on line 7—7, Fig. 6.

Fig. 8 is a horizontal section taken on line 8—8, Fig. 6.

Fig. 9 is a fragmentary section showing the manner in which the distributing plate is secured in position.

Fig. 10 is a fragmentary vertical section taken on line 10—10, Fig. 9.

Figure 1:
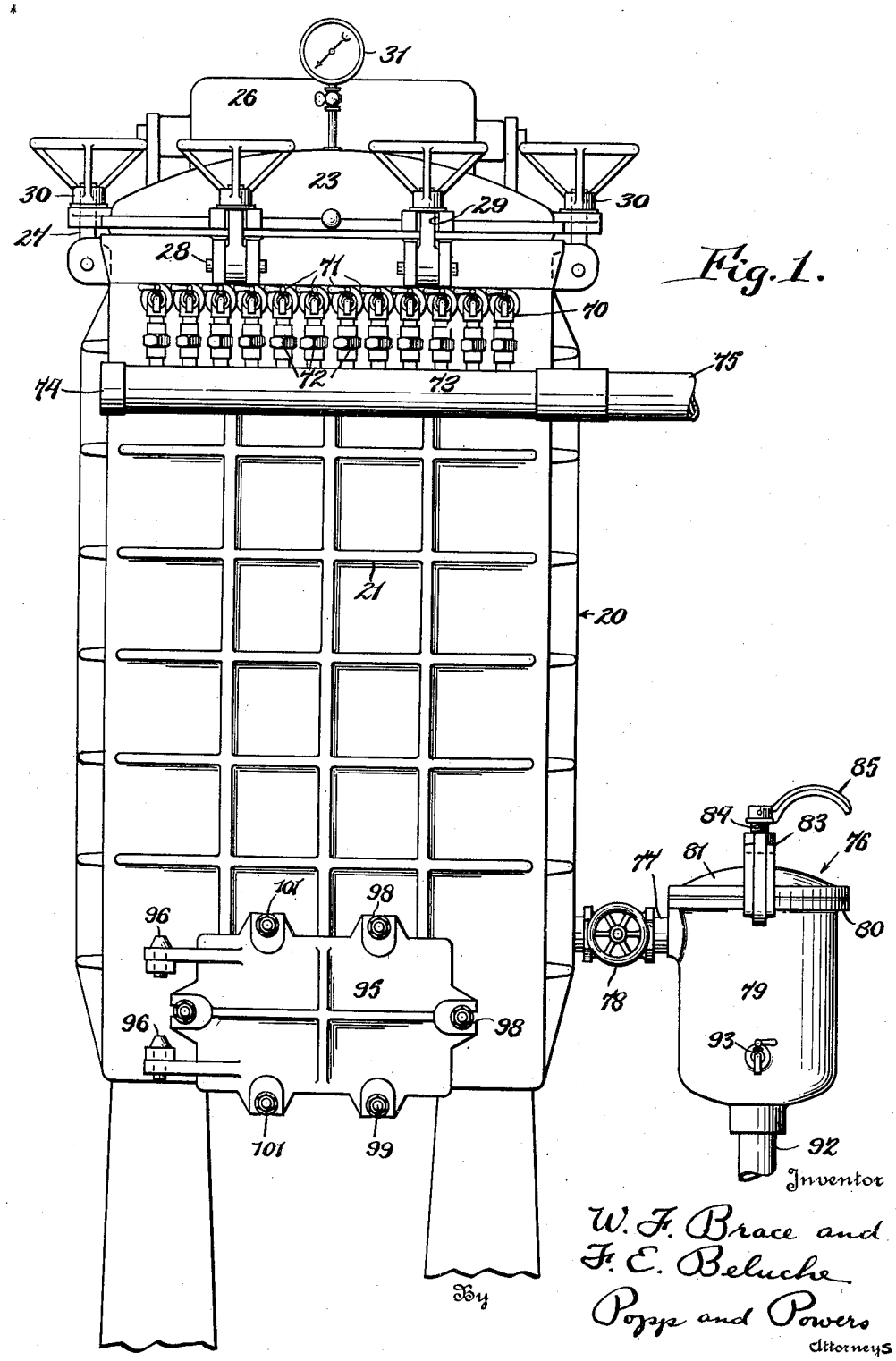
Fig. 1 is a front elevation of a filtering apparatus made in accordance with our invention.

In its general organization this invention comprises a main filter casing in which a plurality of individual removable filter elements are arranged, a distributing plate for uniformly distributing the incoming dirty solvent to the filtering units, individual cocks on the exterior of the filter casing and connected with the individual filtering units so that they can individually be tested as to filtering efficiency, either in becoming clogged or in having holes which permit dirty solvent to pass and a manifold for connecting the outlets of the several filtering elements and providing a means for withdrawing the filtered solvent.

The invention also proposes a supplemental filter of small capacity through which the dirty solvent is by-passed when the filtering units are being cleaned.

The casing 20 of the filtering apparatus is shown as being of rectangular form in horizontal section and made of cast metal, the casing being provided with suitable ribs 21 to strengthen the same. The casing is preferably made of one piece having an integral bottom 22 and the upper end is open to permit of access to the interior of the casing. The open upper end of the casing 20 is closed by a cast metal cover 23 which is hinged to the casing at 24 for vertically swinging movement and is provided with a gasket 25 so that when the cover 23 is closed a leak-tight joint is provided between the cover and the casing 20. The cover 23 is preferably counterweighted as indicated at 26 and the cover is tightly closed by means of a plurality of swing bolts 27, each of which is pivoted as at 28 to wings provided on the casing 20 and swings into a slot 29, these slots 29 being provided at intervals around the margin of the cover 23. The swing bolts 27 carry nuts 30 which are in the form of hand wheels so that the cover can be firmly tightened down and sealed. The cover 23 can also carry auxiliary devices such as a gage 31 giving the reading of the pressure inside of the casing 20 and also a pet cock 32 to permit of exhaust of this pressure. Within the chamber formed by the casing 20 and its cover 23 are a plurality of readily removable filtering units 33. The filtering units are arranged vertically side by side, as best illustrated in Fig. 7 and are individually removable and replaceable so that as any of them become dirty they can be removed and cleaned independently of the others. As best illustrated in Fig. 3 each of these filtering units is composed of a central, heavy, large mesh sheet of screening 34 and on the opposite faces of this central heavy piece of screening are arranged small mesh sheets of filtering screening 35. It is therefore apparent that the heavy central piece of screening 34 forms a chamber into which the solvent filtering through the fine mesh screening 35 passes from the outside of each filtering unit.

Figure 11:
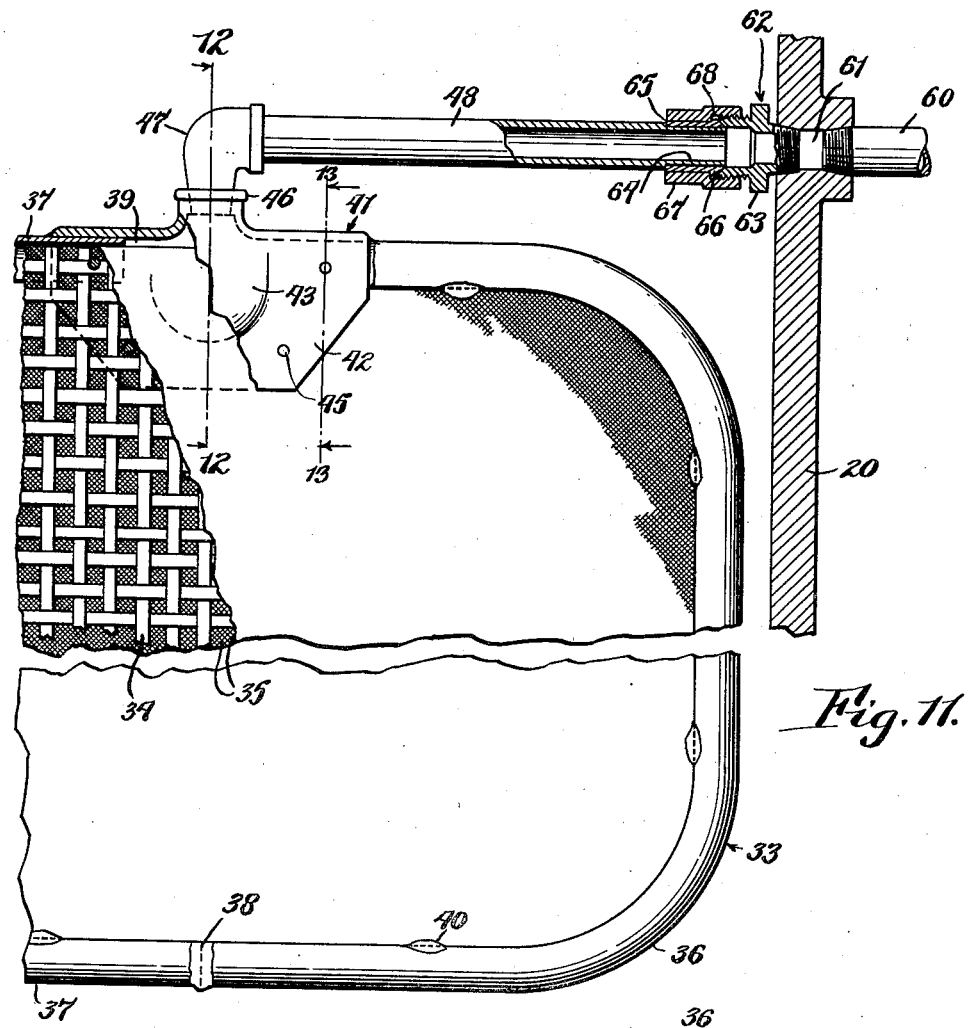
Fig. 11 is an enlarged fragmentary view similar to Fig. 6 and showing in detail the construction of the individual filtering units and the manner in which they are removably secured in position.
Figure 12:
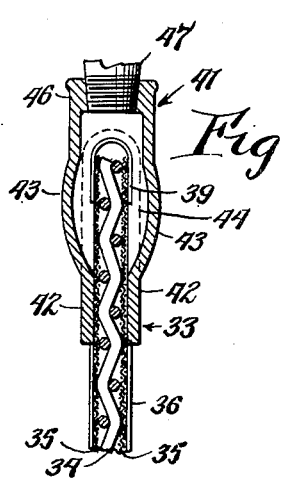
Fig. 12 is a vertical fragmentary section taken on line 12—12, Fig. 11.
Figure 13:
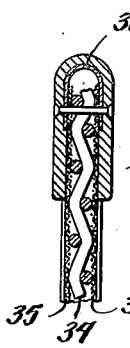
Fig. 13 is a fragmentary section taken on line 13—13, Fig. 11.

This chamber is enclosed by two frame bars 36 and 37 each of these frame bars 36 being U-shaped in cross section and also being U-shaped in outline, as best illustrated in Figs. 11 and 13. These frame bars 36 and 37 are placed around opposite ends of the three sheets of screening 34 and 35 and at one side the abutting ends of the bars 36 and 37 are welded together, as illustrated at 38, Fig. 11, while the opposite adjacent ends of the frame bars 36 and 37 are spaced apart as illustrated at 39. To secure the frame bars to the screening the frame bars can be soldered to the screening at intervals as indicated at 40 although this soldering is not essential to the proper operation of the filtering units. At the upper end of the filtering unit and arranged over and enclosing the space 39 between the ends of the frame bars 36 and 37 is a U-shaped collecting and outlet member 41. The legs 42 of this collecting and outlet member 41 are of substantial area and straddle opposite sides of the ends of the frame bars 36 and 37 and also opposite sides of the screening, as best illustrated in Fig. 12. The opposite legs 42 at their edges or margins fit tightly against the corresponding faces of the frame bars 36 and 37 and the outer faces of the screening 35 and at its center each of these legs 42 is dished outwardly as indicated at 43 to provide an enlarged collecting chamber 44 of substantial area. The U-shaped member 41 is secured in position by a plurality of rivets 45 which pass through the opposite legs 42 of the collecting member 43 and also through the screening and frame bars. At its top each of the collecting members 41 has a nipple 46 which is adapted to receive an elbow 47 connecting with an outlet pipe 48. It is apparent that the dirty solvent entering the chamber 49 formed by the casing 20 passes through the fine screening 35 of each of the filtering units 33 and in doing so leaves the sediment on the exterior screen faces of the filtering units 33, the filtered liquid passing into the chamber formed by the heavy mesh screening 34. This filtered liquid then passes up through the meshes of this heavy screening 34 into the chamber 44 of the collecting and outlet member 41 and out through the elbow 47 and outlet pipe 48.

The dirty solvent enters the filtering chamber 49 through an inlet pipe 50. This inlet pipe 50 is screwed into a distributing chamber 51 which extends substantially the full width of the casing 20 and in order to distribute the flow of fluid into the chamber 49 uniformly over all of the filtering units 33 a distributing plate 52 is interposed between the distributing chamber 51 and the main filtering chamber 49. For this purpose the distributing plate 52, as best shown in Fig. 10, has a plurality of holes 53 spaced at suitable intervals in its face. This distributing plate is held in place by a pair of rods 55 which screw into and are in turn supported in plugs 56. These plugs 56 are screwed into the wall of the casing 20 which forms the distributing chamber 51 from the outside and the rods 55 extend through the distributing plate 52 and are provided with nuts 57 which clamp the distributing plate 52 against the inner side of the casing. This manner of mounting the distributing plate 52 makes the assembly of the distributing plate and main casing 20 very easy and permits the distributing plate to be easily removed for the purpose of cleaning or repair.

The filtering units 33 are supported at their lower ends on a pair of horizontal bars 58 on which they rest, as best shown in Figs. 6 and 7. Each of these bars is supported at its opposite ends in half round sockets 59 formed integrally with the casing 20 so that the bars 58 can be readily removed. The outlet pipes 48 of the several filtering units 33 each communicates with an outlet pipe 60 exterior of the casing and in order to permit of the ready removal of the several filtering units 33 through the open upper end of the casing 20 a connection between the outlet pipes 48 and 60 is provided which, as best shown in Fig. 11, is preferably constructed as follows.

Each of the exterior outlet pipes 60 screws into an opening 61 in the casing 20 and into this opening 61, from the interior of the casing 20 is also screwed a male coupling member 62 which is provided with an enlarged squared or out-of-round part 63 to permit of its being tightly screwed into the casing. The opposite ends of the male coupling member 62 are externally threaded and at the corresponding end the male coupling member 62 is adapted to receive the reduced end 64 of the outlet pipe 48. Around this reduced end 64 is arranged a sleeve 65 which is formed at one end to provide an enlarged head 66, this head terminating in a conical seat which fits into a conical recess provided at the end of the male coupling member 62. A female coupling member 67 is provided which has a reduced end fitting around the sleeve 65 and has an enlarged end which forms a shoulder 68, and is also threaded to engage the external threads of the male coupling member 62. The shoulder 68 is arranged to engage the rear of the head 66 of the sleeve 65 and thereby draw the head 68 into firm engagement with the male coupling member 62 when the female coupling member is tightened up. It is apparent that when it is desired to remove one of the filtering units 63 all that is necessary is to back off the female coupling member 67 whereupon the joint between the pipe 48 and the male coupling member 62 can be readily broken and the filtering unit 63 removed and cleaned. After it is cleaned the filtering unit 33 can be easily reinserted, the outlet pipe 48 placed in alinement with and its sleeve 65 in engagement with the male coupling member 62 and the female coupling member tightened so as to provide a tight and leakproof joint at this point.

Each of the exterior outlet pipes 60 screws into a T-fitting 70 into the opposite arm of which is screwed a cock 71. This cock is for the purpose of testing the efficiency of the corresponding filtering unit 33. Thus after a period of operation the operator opens all of the cocks 71 and observes their flow. In accordance with the relative flow of solvent from the several cocks the operator can determine the relative efficiency of the filtering units 33. Thus if there is no flow from some of the cocks the operator knows that the corresponding filtering units are completely choked with sediment and require cleaning. If, on the other hand, a flow of dirty solvent is observed from any of the cocks the operator knows that a hole has developed in the corresponding filtering unit and that it is failing to act properly in filtering. If, on the other hand, a substantial flow of clean solvent comes from each of the cocks 71 the operator knows that the filtering apparatus is in good working order. The cocks 71 are, of course, normally turned off and this filtered solvent passes through the lower branch of each of the T-fittings 70 and through a union 72 which connects the T-fitting 70 with a horizontal manifold 73. This manifold is preferably in the form of a pipe just capped at one end as indicated at 74 and connects with a filtered solvent outlet pipe 75.

During the cleaning of the filtering units 33 it is desirable not to interrupt the filtering operation but to provide a continuous withdrawal of dirty solvent from the system and a little of cleaned solvent. For this purpose an auxiliary filtering unit 76 is provided which operates while the filtering units 33 are being cleaned. The inlet pipe 77 to this auxiliary filtering unit 76 is provided with a valve 78 and communicates with the interior chamber 49 of the casing 20. This inlet pipe 77 is screwed into the housing 79 of the auxiliary filtering unit 76, this housing 79 being provided with a rim 80 at its open upper end. Over this open upper end is placed a cover 81, and a gasket 82 is placed between the rim of this cover and the rim of the housing 79. A bail 83 is arranged over the cover 81 and the ends of this bail engage under the rim 80 of the housing 79. At its center the bail 83 carries a vertical screw 84 which is provided with a handle 85 at its upper end. The screw 84 engages a recessed boss 86 provided in the cover 81 so that when the handle 85 is turned to force the screw 84 down, the screw 84 forces the cover into sealed engagement with the housing 79 and prevents the escape of fluid.

Below the inlet pipe 77 an internal annular flange 87 is provided within the housing 79 and this flange 87 supports an annular ring 88, a gasket 89 being interposed between this ring 88 and the flange 87. To this ring is suitably secured a perforated basket 90 and for removing the ring 88 and its basket 90 a bail 91 is suitably secured to the ring 88. The lower end of the housing 79 communicates with an outlet pipe 92 through which the filtered solvent is returned for use in the dry cleaning system. A suitable pet cock 93 is provided in the lower part of the housing 79 for testing the efficiency of the auxiliary filter 76. After a substantial length of operation of the apparatus a large amount of sediment collects in the bottom of the chamber 49. In time it is necessary to remove this sediment and for this purpose a clean-out opening 94 is provided at the lower end of the casing 20, this clean-out opening 94 being closed by a clean-out door 95. This clean-out door is hinged to the casing 20 in any suitable manner as indicated at 96 and is provided with a gasket 97 which forms a seal between the door 95 and the casing 20. To insure a tight joint between the clean-out door 95 and the casing 20 a plurality of slots 98 are provided at intervals around the door 95 and these slots each receives a swinging bolt 99, these swinging bolts being shifted to the casing 20 for outwardly swinging movement relative to the door 95 as indicated at 100. Each of these swinging bolts 99 carries a nut 101 by means of which the door is clamped against the side of the casing.

In a normal operation of the filtering apparatus the dirty solvent enters the inlet pipe 50 and distributing chamber 51 and strikes the distributing plate 52. The perforations 53 in this distributing plate distribute the dirty fluid uniformly to the group of filtering units 33 and each filtering unit 33 therefore bears its proportionate share of the load. The dirty solvent, under pressure, passes through the fine screening 35 on opposite sides of each filtering unit 33 and in doing so leaves its sediment on the exterior face of the fine screening 35, a part of this sediment being washed down by the flow of dirty solvent from the distributing plate 52 and settling in the bottom of the chamber 49. The solvent, relieved of its sediment, circulates through the mesh of the heavy central screen 34 of each filtering unit 35 and finds its way to the collecting chamber 44 from which it passes out through the elbow 47, outlet line 48, union 62, 67 and exterior outlet pipe 60. From there it flows through the union 72 to the manifold 73 where the cleaned fluid from all of the filtering units 33 mingles and passes out through the outlet pipe 75 and is returned to the system for re-use. After a period of operation the operator opens each of the cocks 71 and through their relative flow determines which of the filtering units 33 have become clogged and are no longer functioning and when he decides that one or more of the units 33 requires cleaning he cuts off the flow of dirty solvent to the system, opens the cover 23 by loosening the nuts 30 on the swing bolts 27 and uncouples the union 62, 67 and removes the desired number of filtering units 33. He thereupon closes the cover 23, and again starts the flow of fluid to the chamber 49, at the same time opening the valve 78 which permits this dirty fluid to pass into the auxiliary filter 76. The dirty fluid then flows from the chamber 47, through the pipe 77 into the upper end of the housing 79 and into the perforated basket 90. In passing through these perforations of the basket 90 the sediment is retained within the basket 90 and the cleaning fluid from the opposite side of this basket passes out through the outlet pipe 92 from which it is returned for re-use in the same manner as the cleaning fluid from the outlet pipe 75.

After the filtering units 33 have been cleaned the flow of fluid through the apparatus is again cut off, the cover 23 is opened up, the filtering units 33 are reinserted into the chamber 49 and the quick detachable couplings 62, 67 are secured together. The operator then closes the cover 23, turns off the valve 78 and starts the flow of dirty fluid into the chamber 49 from which it passes out through the filtering units 33, quick detachable union 62, 67 and manifold 73 in the manner first described. After the apparatus is again running the operator loosens the screw 84, opens the cover 81 and removes the perforated basket 90 and after cleaning this basket 90 reinserts it and closes the cover 81.

From the foregoing it is apparent that the present invention provides a filtering apparatus which is very compact and inexpensive in construction. It also operates efficiently in the filtering of dirt and sediment from a liquid, and through the uniform distribution of the dirty fluid to the several filtering units will filter for a long time before the filtering units 33 become clogged with sediment and require cleaning. The incoming fluid is also introduced in such manner as to wash the filtering units 33 and thereby reduce the tendency of these filtering units to become clogged with sediment and inefficient. The filtering apparatus is also designed to permit of quickly testing the efficiency of the several filtering units by opening the cocks 71 and when it is determined that the filtering units 33 need cleaning their removal and reinsertion for the purpose of cleaning can be accomplished quickly and easily. At the same time during the work of cleaning the filtering units 33 auxiliary means are provided whereby the operation of the apparatus is continued through the auxiliary filter 76 and there is therefore no substantial interruption in the withdrawal of dirty solvent from the source and return of cleaned solvent.

While we have shown a specific embodiment of our invention it is to be understood that it is capable of radical changes in construction and the invention is therefore not to be construed as limited to the precise embodiment shown but only as limited by the terms of the following claims.

We claim as our invention:

1. In a filtering apparatus of the character described, an enclosing casing having a rectangular top and bottom and four sides connecting said top and bottom, a plurality of flat filtering units arranged in spaced face-to-face relation in said casing, each of said units comprising at least one foraminous member forming a central chamber and the opposite vertical edges of all of said units being arranged immediately adjacent the corresponding opposite walls of said casing and the outer faces of the endmost units being arranged immediately adjacent the other opposite walls, a distributing chamber formed in one wall of said casing adjacent the edges of said units and extending substantially the full horizontal extent of said wall, said chamber extending outwardly from said wall and being open on one side to the interior of said casing, an inlet pipe connected to said chamber, a flat perforated plate secured flat against the inner side of said casing and extending over the open side of said distributing chamber, means for conducting the filtered liquid from the interior chambers of each of said units, and means for detachably securing said plate in position.

2. In a filtering apparatus of the character described, an enclosing casing having a rectangular top and bottom and four sides connecting said top and bottom, a plurality of flat filtering units arranged in spaced face-to-face relation in said casing, each of said units comprising at least one foraminous member forming a central chamber and the opposite vertical edges of all of said units being arranged immediately adjacent the corresponding opposite walls of said casing and the outer faces of the endmost units being arranged immediately adjacent the other opposite walls, a distributing chamber formed in one wall of said casing adjacent the edges of said units and extending substantially the full horizontal extent of said wall, said chamber extending outwardly from said wall and being open on one side to the interior of said casing, an inlet pipe connected to said chamber, a flat perforated plate secured flat against the inner side of said casing and extending over the open side of said distributing chamber, means for conducting the filtered liquid from the interior chambers of each of said units, means for detachably securing said plate in position, comprising a pair of screw plugs screwed into the wall of said distributing chamber from the exterior thereof, and a pair of screw fastenings each extending through said distributing plate and screwing into the corresponding plug.

In testimony whereof we hereby affix our signatures.

WILLIAM F. BRACE.
FERNAND E. BELUCHE.